United States Patent [19]
Newell

[11] 3,983,328
[45] Sept. 28, 1976

[54] TELEVISION SYSTEM FOR THE DISPLAY OF VISUALS WITH HIGH RESOLUTION

[75] Inventor: George F. Newell, Sutton, England

[73] Assignee: Westinghouse Electric Corporation, Pittsburgh, Pa.

[22] Filed: Mar. 7, 1975

[21] Appl. No.: 556,373

[52] U.S. Cl. .................................... 178/6.8; 178/6; 178/DIG. 1; 178/DIG. 3; 178/DIG. 23; 178/7.5 SE

[51] Int. Cl.[2] .......................................... H04M 5/78

[58] Field of Search ......... 178/6.8, DIG. 23, DIG. 1, 178/6, DIG. 3, 7.5 SE

[56] References Cited

UNITED STATES PATENTS 3,697,678 10/1972 Belleson ........................ 178/DIG. 6

*Primary Examiner*—Benedict V. Safourek
*Assistant Examiner*—Edward L. Coles
*Attorney, Agent, or Firm*—M. P. Lynch

[57] ABSTRACT

In a television system, the display by a monitor forms a high resolution window-like frame that is selectively movable about a larger scene which is transmitted as an array of contiguous frames. Separate tracks on a disc-type recorder are used to store a video signal from a camera corresponding to each frame making up the array of contiguous frames in the scene. Either the camera or the scene is repositioned to view each frame in the scene. The video signals are recorded at phase-displaced relations by phase shifting the sweep waveform supplied to the camera while scanning each component of the scene. The replayed video signals corresponding to the array of contiguous frames in the scene are blanked by gates controlled by adjustable delay circuits to select a single frame of unblanked video signal for display by a monitor which coresonds to a portion of the entire scene.

15 Claims, 16 Drawing Figures

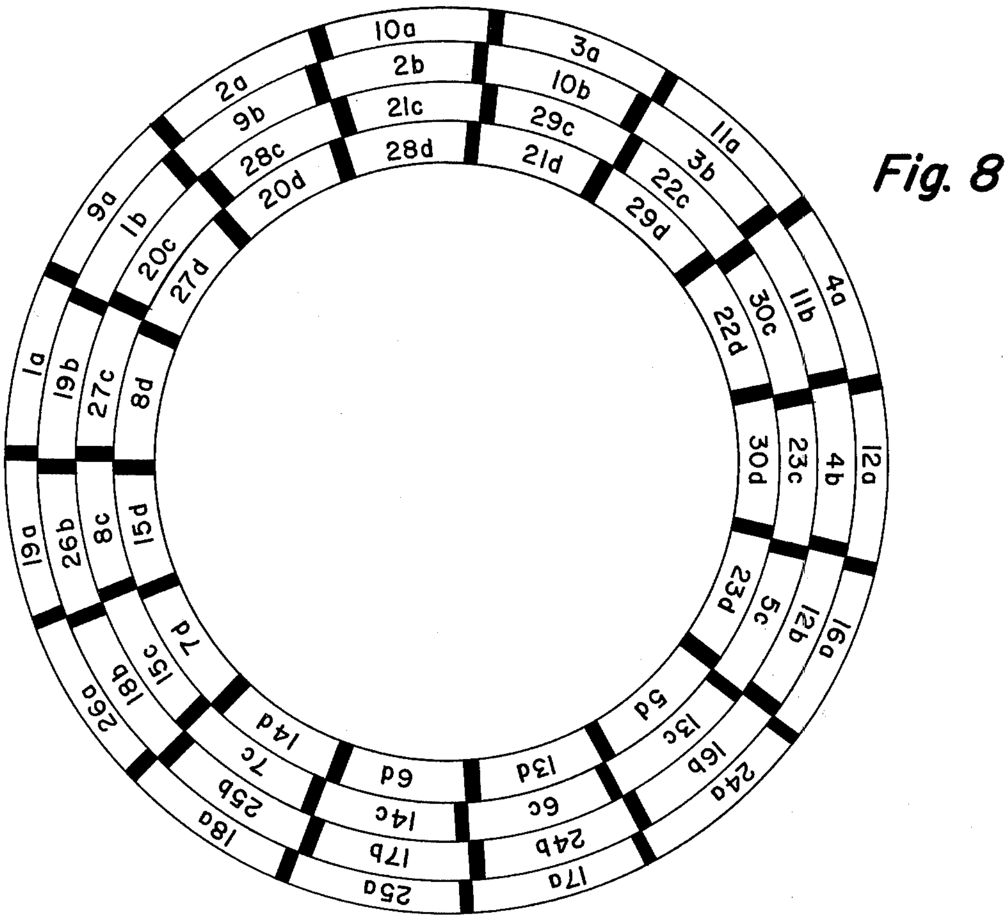
Fig. 8
Fig. 7
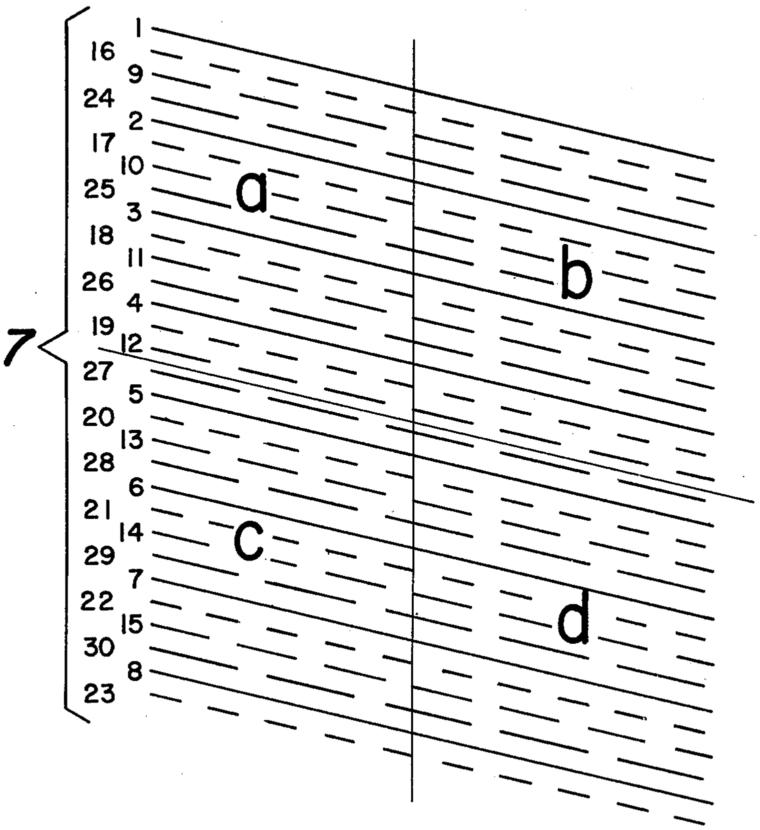

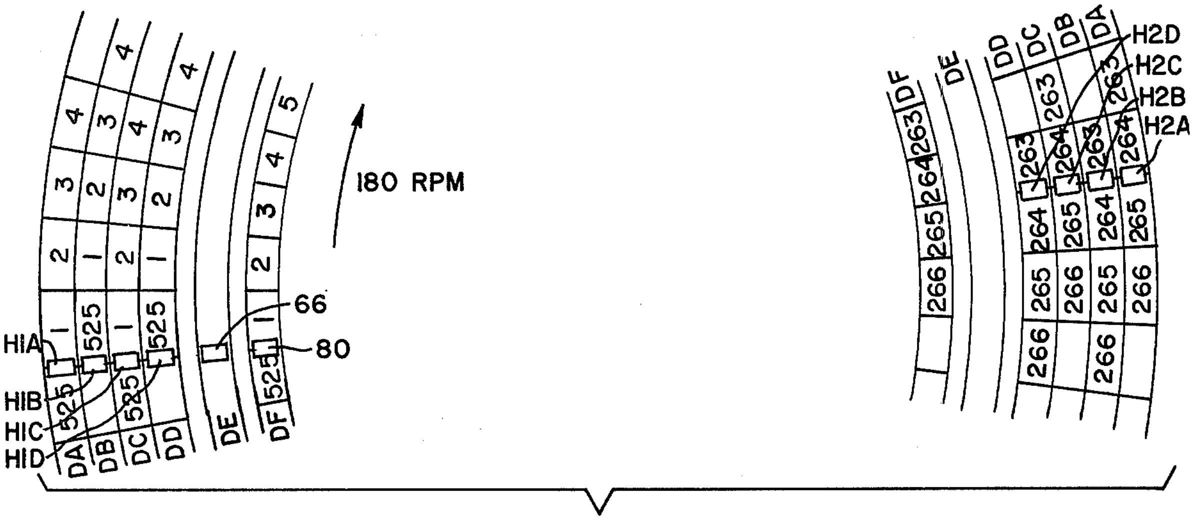
Fig. 13
Fig. 14
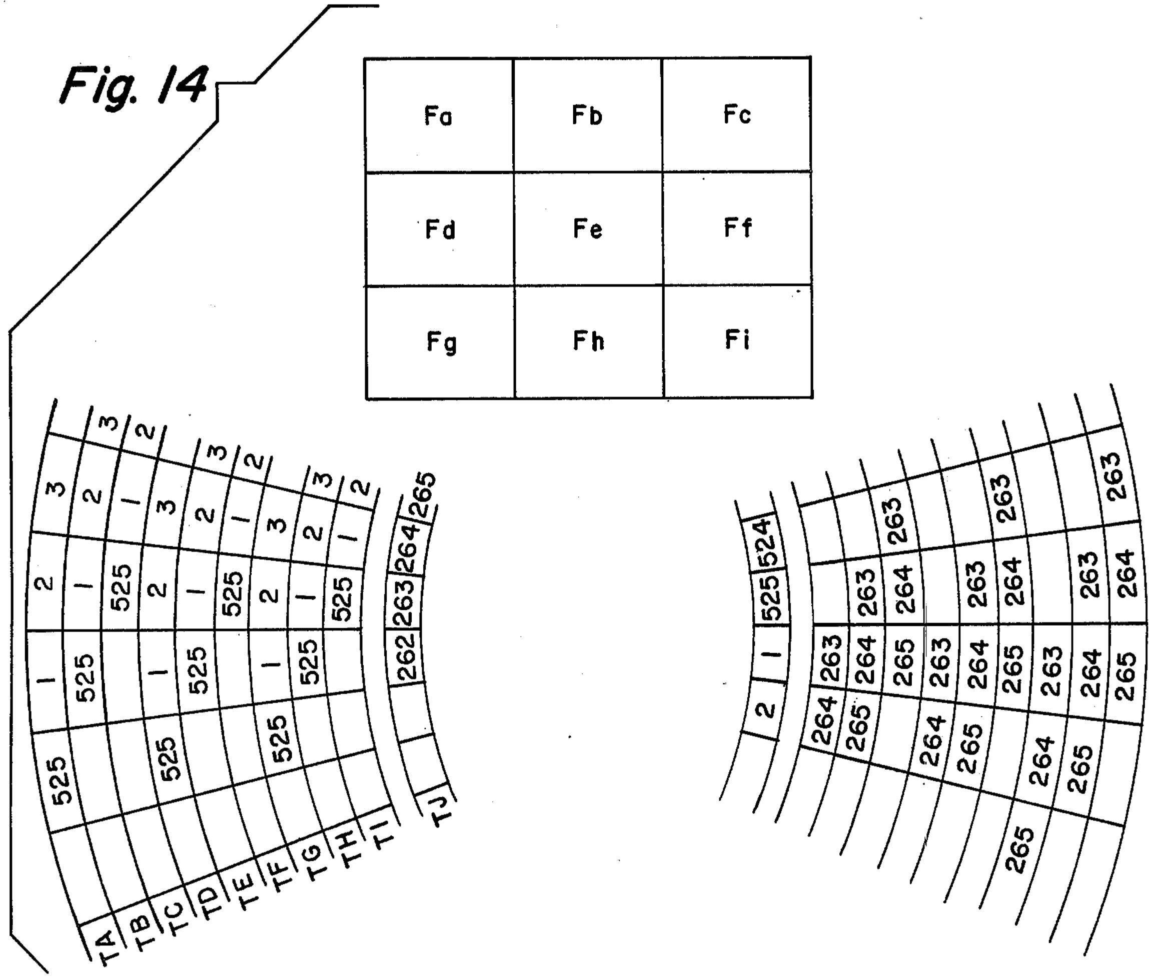

TELEVISION SYSTEM FOR THE DISPLAY OF VISUALS WITH HIGH RESOLUTION

BACKGROUND OF THE INVENTION

This invention relates to a television system for providing a high resolution display frame which can be moved about and freely selected from an array of contiguous frames corresponding to a much larger scene which is transmitted by a separate video signal for each frame and separately recorded on a storage medium. More particularly, the present invention employs television techniques to reproduce visuals with virtually unlimited resolution without requiring that the apparatus forming a television system have a corresponding resolution capability.

The human eye has a sensitivity which will enable one to identify and distinguish a great amount of fine detail within a scene. When a scene consisting of a checkerboard pattern made up of alternating black and white squares is reproduced by a television system, the horizontal scan lines forming the video signal must have a bandwidth consistent with the rate at which the squares change from black to white in each horizontal scan line. It, therefore, follows that as the size of the square in the scene decreases, the frequency video signal increases which, in turn, increases the bandwidth requirement. Television standards in the United States provide for a video signal ranging from 30 cycles per second to about 4 megahertz which gives sufficient picture resolution to enable the viewing of a dot that is subjectively as wide as the spacing between lines. The actual size of the horizontal line depends on the focus, screen size and adjustments of the set but the standards of the system provide that there are always 525 scan lines in a full frame, of which, approximately 480 may be visible in a display.

The television system providing a display of high resolution visuals above that obtainable with a standard television system presents three problem areas. First, there is a practical limit to the resolution obtainable with a television camera which at present has an upper limit of about 1000 lines per raster. This limit is imposed by the size of an electron beam produced in a camera with reasonable sensitivity and at a reasonable cost. Second, the resolution of display monitors are limited in a similar way by the size of the electron beam. The third problem area is the bandwidth requirement which affects the camera circuits, monitor circuits, but more seriously affects connecting links, intermediate recording equipment as well as transmitters and receivers. The bandwidth requirements can be alleviated if the time period for each frame of the picture is increased but then the display has an objectionable flicker. The impact of the flicker can be alleviated by longer storage times by the phosphor screen but even then the resolution obtainable by the display tube is limited to about 1000 lines per frame. The bandwidth required to transmit a picture of 1000 lines per frame is four times that required to transmit a picture of 500 lines per frame. Thus, to convey a 1050-line picture with the same bandwidth requirements as a 525-line picture, the frame repetition frequency must be reduced by a factor of 4.

The use of television techniques in a system for the display of high resolution visuals has been the aim of display engineers for many years. The convenience of recording communications and the distribution of information have been largely outweighed by the limited resolution available when standard video recorders and displays are employed. Special-purpose cameras and flying-spot scanners have a resolution which is much greater than the resolution of conventional recorders and monitors. By taking advantage of the fact that the human eye can only resolve detail in a small area at one time, the television system of the present invention makes available to the eye a conventional television display which can be adjusted to present any desired area of a much larger display forming a scene. The television system of the present invention is effective in a somewhat analogous manner to viewing a scene such as a picture containing very fine detail through a magnifying glass by moving it about the entire scene.

SUMMARY OF THE INVENTION

In accordance with the present invention, there is provided a television system for producing a video signal which corresponds to a window-like display frame that can be selected from and moved about a much larger scene which is transmitted by a plurality of video signals corresponding to an array of contiguous frames making up the scene.

More specifically, according to the television system of the present invention there is provided means for producing separate video signals each corresponding to separate frames forming an array of contiguous frames of a scene, a storage medium including independent recording means for separately recording the video signals corresponding to each frame, and means to synchronize the video signals into phase-lifted relations for separate recordings by the storage medium such that a video signal corresponding to one component frame of the scene is recorded at a predetermined time-displaced relation relative to the recording of the video signal corresponding to a different component frame that is contiguous therewith in the scene. This system may additionally include an adjustable time delay means coupled to blanking gates for selecting a composite frame of unblanked portions of video signals which are replayed from the storage medium for display by a monitor.

In a further aspect of the invention, there is provided a television system including display means responsive to a video signal having a desired bandwidth and corresponding to a window-like portion of a scene freely selectable from an array of contiguous component frames, camera means trained on a scene and controlled by a sweep circuit to produce a single frame of video signal with a materially increased bandwidth as compared with a desired bandwidth of a video signal for delivery to the display means, gate means coupled to the camera means for blanking selected portions of the video signal to form contiguous component frames thereof, a buffer store for reducing the bandwidth of each component frame of video signal by increasing the sweep time period in a manner to provide corresponding video signals having a desired bandwidth, and a storage medium for separately recording the video signals with a reduced bandwidth. The aforementioned buffer store may take the form of two time buffer systems, one time buffer system to reduce the bandwidth of the received video signals for transmission over a narrow bandwidth medium and a second time buffer system to increase the bandwidth of the transmitted video signals to a desired bandwidth for displaying the video signals. In the preferred form, each time buffer system includes an analog-to-digital converter receiving the video signals for each component frame which signals have a bandwidth different from a desired bandwidth, a shift register coupled to the converter for storing the digital signals produced thereby, and a digital-to-analog converter coupled to the shift register for producing analog video signals with a desired bandwidth corresponding to the separate video signals.

According to another aspect of the present invention, there is provided a television system including the combination of a camera means coupled to a sweep control circuit to scan a scene for producing a frame of video signal consisting of double-interlaced scan lines whereby the frame of video signal is made up of four fields, the video signal having a materially increased bandwidth as compared with a desired bandwidth of a video signal for displaying a component frame of a scene, a magnetic storage medium having two diametrically-arranged recording heads for each track to record a separate video signal corresponding to a component frame making up an array of contiguous frames forming the scene, gate means receiving the double-interlaced video signal for delivering unblanked portions thereof to each recording head, means for delivering a blanking control signal to the gates for distributing the double-interlaced video signal to the recording heads to thereby record on the storage medium separate video signals corresponding to an array of contiguous component frames forming the scene. This television system may additionally include a cathode-ray tube for displaying a frame of the video signal representing only a portion of the video signals that are separately recorded by the storage medium, and control means including gates for blanking out all but a contiguous portion of the replayed video signals from the storage medium to form a selected single frame of video signal for display by the cathode-ray tube.

In another aspect of the present invention, there is provided in a television system of the type wherein a single frame of video signal having a desired bandwidth is selected for display by a television receiving tube, the selected display frame being a windowlike portion of an entire scene which is transmitted as an array of contiguous component frames and recorded on separate tracks of a storage medium, an apparatus for displaying the entire scene including two spaced-apart replay heads for each track on the storage medium for replaying video signals corresponding to the array of contiguous component frames forming an entire scene, gate means for selecting contiguous scan lines from the replayed video signals corresponding to the array of contiguous component frames to form a single high resolution video signal corresponding to the entire scene, filter means for limiting the bandwidth of the high resolution video signal, and a time buffer store for reducing the scan line time period of the high resolution video signal to a lower resolution video signal having a desired scan line time period to display the entire scene on the face of a television receiving tube.

BRIEF DESCRIPTION OF THE DRAWINGS

These features and advantages of the present invention as well as others will be more readily apparent when the following description is read in light of the accompanying drawings, in which:

FIG. 7 is an example illustrating double-interlaced scanning of a raster by a camera according to a third embodiment of the present invention;

FIG. 8 illustrates the distribution of double-interlaced scan lines on separate recording tracks according to the example in FIG. 7 of the third embodiment of the present invention;

FIG. 13 is an illustration similar to FIG. 11 but further illustrating an additional recording track for storing a video signal of an entire scene according to the fourth embodiment of the present invention; and FIG. 14 is an illustration similar to FIG. 13 of a modified television system according to the fourth embodiment of the present invention.

DESCRIPTION OF THE PREFERRED EMBODIMENTS

Figure 1:
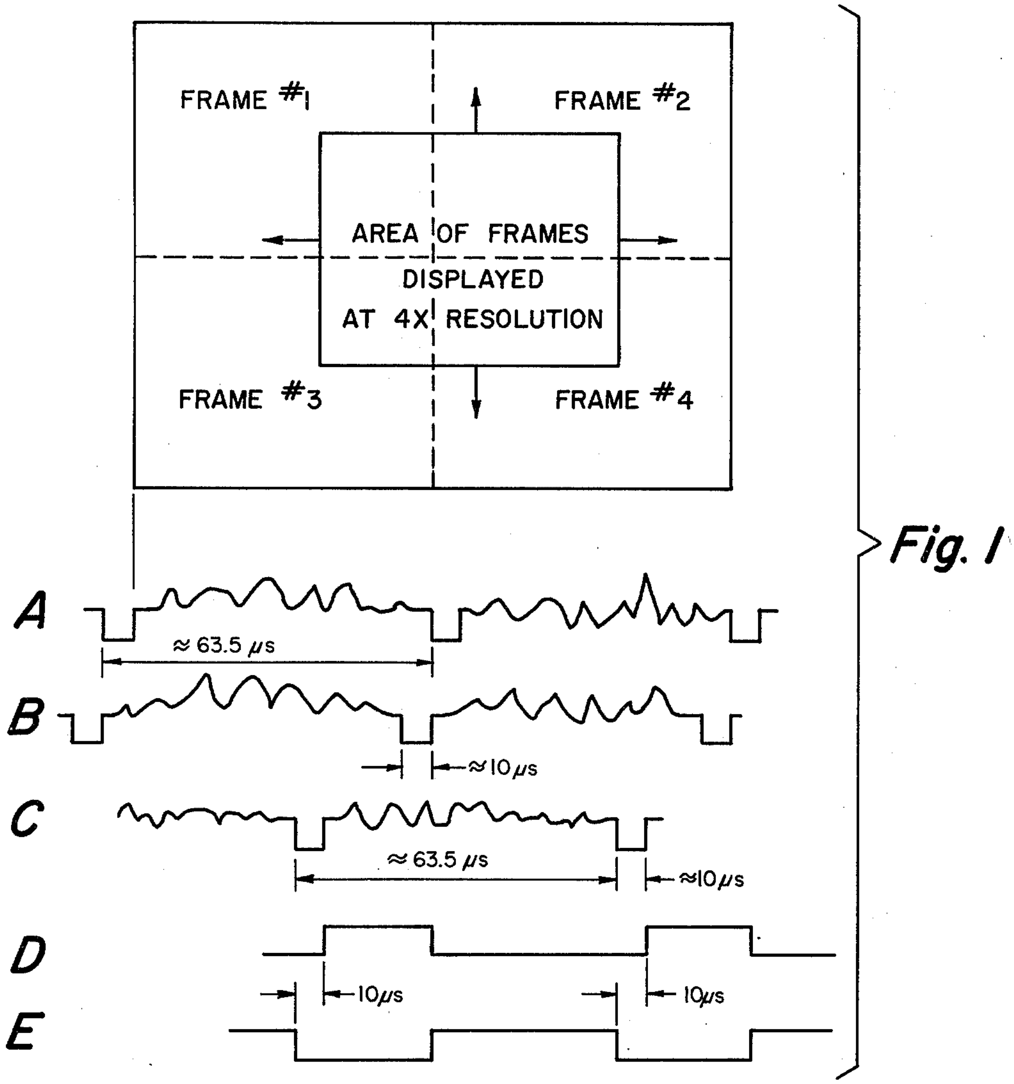
FIG. 1 illustrates, according to a first embodiment of the present invention, a scene divided into an array of contiguous component frames for transmission in relation to a display frame which can be freely moved about the scene, waveforms A–E of FIG. 1 illustrate the phase-displaced relation of horizontal scan lines forming the video signals of the scene.
Figure 2:
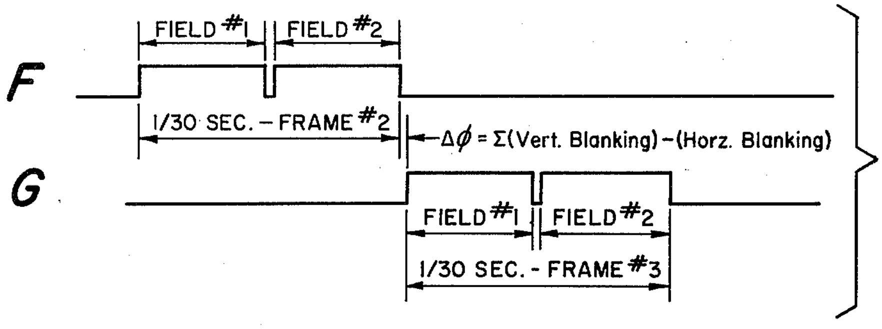
FIG. 2 illustrates, by waveforms F and G, the phase shift relation between video signals of frames which are not horizontally or vertically adjacent one another in the scene.
Figure 3:
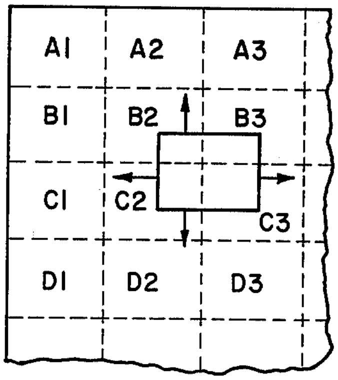
FIG. 3 illustrates an N by M array of component frames making up a scene.

A television system according to a first embodiment of the present invention is illustrated in FIGS. 1–4. In FIG. 1, the overall shape of the rectangular block is intended to represent a scene. The scene may take the form of an engineering drawing, a letter-type document, a photographic slide or the like. For the purpose of describing the present invention, let it be assumed that the resolution obtainable by a standard 525-line television camera when trained on the entire scene is less than that adequate in the system. According to the present invention, the resolution of a scene is materially increased while using a standard 525-line camera by subdividing the scene into an array of four component frames labeled in FIG. 1 as frame No. 1, frame No. 2, frame No. 3 and frame No. 4. To provide a separate 525-line video signal corresponding to each one of these frames, either the camera is indexed to train the camera on the frames according to their numbered sequence or, alternatively, the scene itself can be indexed relative to the camera. As will be described in greater detail hereinafter, a video signal forming a single display frame is formed by selecting unblanked portions of the video signals corresponding to the array of frames in the scene. A relevant comparison can be made in regard to the resolution of the displayed frame from the scene. By using the same 525-line camera, the display frame will have four times greater resolution than when the camera is trained on the entire scene. The television system of the present invention provides that the display area of a scene can be freely moved about the scene to provide a visual with increased resolution. Thus, the component frames in the scene of FIG. 1 form a 2-by-2 array which increases the resolution of the displayed frame by a power factor of 4. It, therefore, follows that an N by M array of frames making up a scene provides an increased resolution equal to N × M. In this regard, FIG. 3 illustrates a scene made up of an N by M array of component frames consisting of rows of frames A1, A2, A3, etc. and columns of frames A1, B1, C1, D1, et. The effect, therefore, of the displayed frame is somewhat analogous to moving a magnifying glass over the scene containing fine detail. By properly choosing the electron-optics for the camera, virtually any increased resolution can be obtained by the television system of the present invention.

Returning, now, to FIG. 1 of the drawings, it is apparent that the principle involved in a first embodiment of the present invention concerns producing a video signal corresponding to component parts of a picture in such a manner that the detail contained therein can be resolved to a desired extent by a camera which will be assumed to be a standard 525-line camera. The resolution corresponds to a 1050-line camera but the video signals are recorded and displayed with apparatus requiring only a standard 525-line video signal. The separate video signals corresponding to the four frames are recorded on separate tracks of a magnetic disc recorder in such a manner that the active portion of the swept waveforms for the separate frames adjoin so that a contiguous video signal is available corresponding to all the frames in the array forming the scene. In FIG. 1, the video waveform A represents two horizontal sweeps of frame No. 1. Since this video signal is produced by a standard 525-line camera, the duration of the horizontal scan line is at a standard 63.5 microseconds with a video portion preceded by a horizontal blanking interval of approximately 10 microseconds. Thus, the active video portion of each scan line has a duration of approximately 53.5 microseconds. The video signals for the component frames are separately recorded by a disc recorder in a phase-shifted relation. The video portion for frame 2 must be recorded in such a manner that the horizontal blanking interval does not separate the active portions of the scan lines for frames No. 1 and No. 2. This is done by recording the video waveform for frame No. 2 in a phase-shifted relation as shown by waveform B. The extent of the phase shift of the video signal for frame No. 2 corresponds to the horizontal blanking interval of approximately 10 microseconds. When replaying the video signals for frames No. 1 and No. 2, a contiguous 63.5-microsecond video signal can be selected from any part of frames No. 1 and No. 2. This is typically illustrated by waveform C wherein it will be observed that the standard horizontal blanking interval of 10 microseconds is followed by a horizontal scan line formed by unblanked portions of the video signals of frames No. 1 and No. 2. The active video portions of the frames are selected by gates controlled by blanking pulses. The gating waveforms for frames No. 1 and No. 2 take the form of blanking pulses, according to waveforms D and E, respectively. The usual blanking interval between horizontal scan lines occurs by a blanked coincidence for a 10-microsecond interval. The video signals for frames No. 3 and No. 4 are recorded on separate tracks in the same phase-displaced relation as just described in regard to the video signals for frames No. 1 and No. 2. The horizontal sweep times for frames No. 1 and No. 3 must be identical and similarly the horizontal sweep times for frames No. 2 and No. 4 must be coincidentally timed and identical. The phase displacement of frames No. 3 and No. 4 with respect to frames No. 1 and No. 2 must correspond to a period of time given by the vertical blanking interval plus the horizontal blanking interval. This is illustrated by waveforms F and G of FIG. 2 wherein it will be observed that field No. 2 of frame No. 2 is phase advanced with respect to field No. 1 of frame No. 3 by a time interval corresponding to the vertical blanking interval minus a horizontal blanking interval. In terms of a standard 525-line camera, this phase-displacing interval corresponds to a vertical blanking period of approximately 20 horizontal scan lines minus a 10-microsecond horizontal blanking interval.

Figure 4:
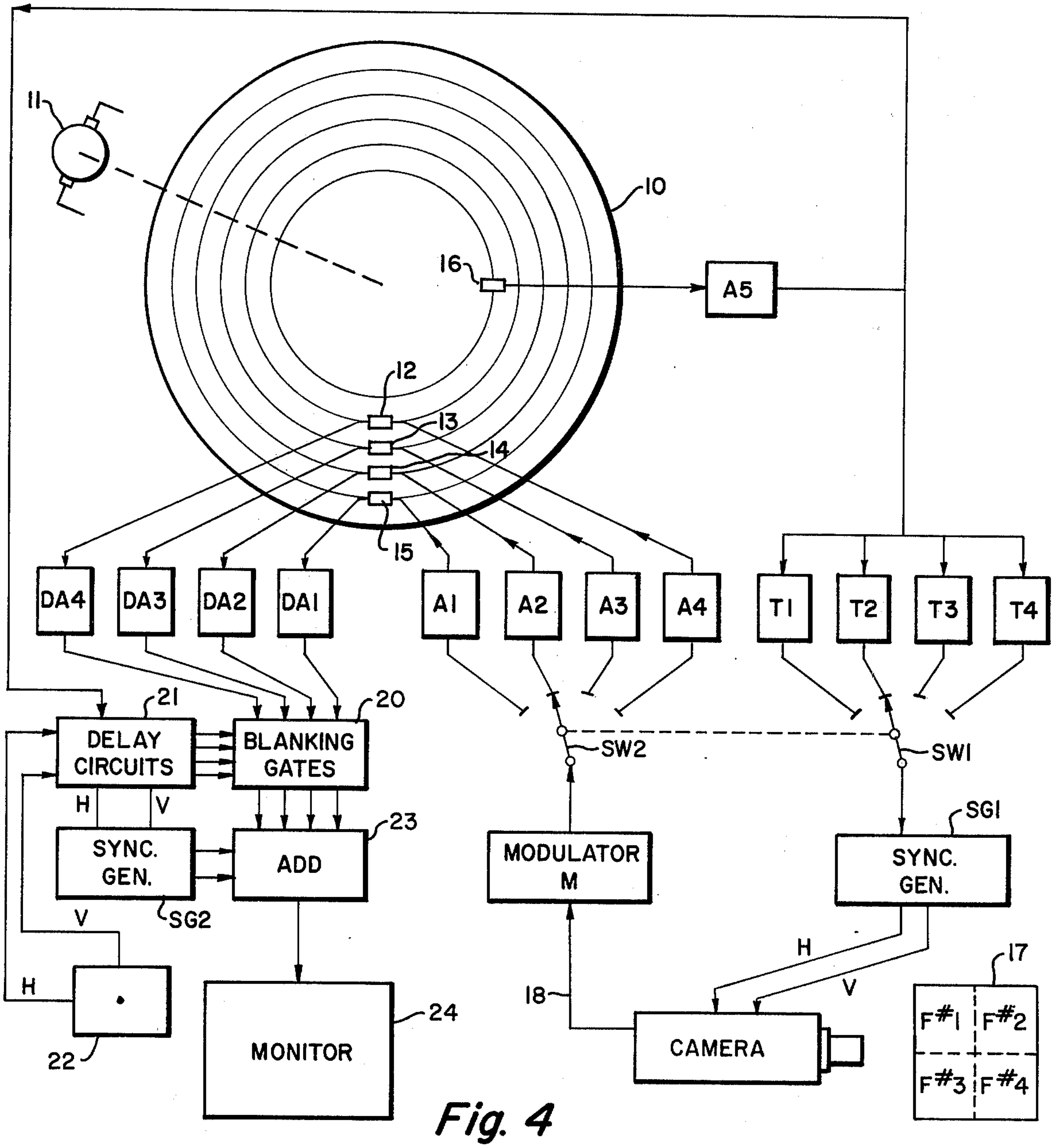
FIG. 4 is a schematic diagram of the television system according to the first embodiment of the present invention.

FIG. 4 illustrates the essential parts of a television system for reproducing visuals with a four-fold increased resolution in the manner already described in regard to FIGS. 1 and 2. The system includes a magnetic disc-type recorder 10 forming a storage medium which is driven by a constant speed motor 11 at, for example, 1800 revolutions per minute. Since, according to FIGS. 1 and 2, four frames of video signals are produced corresponding to the array of component frames in the scene, separate tracks are defined on the disc recorder by four radially-spaced magnetic recording heads 12–15. A fifth track is the inner track defined on the magnetic disc and has a replay head 16. The inner track will be assumed to contain a previously-recorded synchronizing waveform which may take the form of conventional composite synchronizing waveforms or, as will be discussed herein, in the form of horizontal and vertical timing pulses. These pulses may be identified by means of pulse width or polarity inversion.

The replay head 16 supplies the synchronizing waveform to an amplifier A5 having its output coupled to four separate time delay units T1, T2, T3 and T4. The time delay units are adjustable as to their delay time interval so as to provide the desired phase displacement of the video signals corresponding to frames No. 1, No. 2, No. 3 and No. 4. The phase displacement of the synchronizing pulses at the output of time delay unit T2 with respect to the output from time delay unit T1 corresponds to a 10-microsecond interval so that horizontal sync pulses from time delay unit T2 precede the horizontal sync pulses from time delay unit T1 by 10 microseconds. The same phase shift relation exists in regard to sync pulses delivered from time delay units T3 and T4. The phase displacement of the sync pulses delivered from time delay units T3 and T4 with respect to time delay units T1 and T2 corresponds to the vertical blanking interval. The phase displacement can be expressed on the basis of assuming a zero time delay by unit T4. In this event, the delay in unit T3 will equal a horizontal blanking period, the delay in unit T2 will equal a vertical blanking period and the delay in unit T1 will equal the vertical blanking period plus the horizontal blanking period.

The phase displaced sync waveforms are applied to separate terminals of a switch SW1 whereby a particular sync waveform is selected to control a synchronizing waveform generator SG1. This generator supplies horizontal and vertical sweep waveforms to a camera C1 which is focused on a component frame of a scene, for example, a sheet of paper 17. When the switch SW1 is positioned to deliver the timing pulses from delay unit T1 to the camera, the camera will be trained on the component frame F1 of the scene and produces a corresponding frame of video signal in line 18. Following this, either the camera or the scene will be shifted to frame F2 in an accurately controlled manner and switch SW1 is repositioned to deliver timing pulses from the delay unit T2 to the sync generator for controlling the camera. In a similar way, the timing pulses delivered from the time delay units T3 and T4 will be selected to control the sync generator for the camera when the camera is trained on the component frames F3 and F4, respectively. Switch SW1 is mechanically coupled to switch SW2 so that when a particular timing pulse waveform is delivered to the sync generator SG1, the frame of video signal is conducted by line 18 to a modulator M. The modulated frame of video signal is delivered through switch SW2 to one of the amplifiers A1–A4 having their outputs separately coupled to the recording heads 12–15. In this way, four separate recordings are made on the disc recorder, each having a desired phase-shifted relation with respect to the other.

The replayed video signals in their phase-shifted relation are selectively blanked to provide an unblanked standard 525-scan line video signal which can be displayed by a monitor after the addition of horizontal and vertical sync pulses. To accomplish this, four individual demodulating amplifiers DA1–DA4 separately deliver the replayed video signals to blanking gates 20. These blanking gates are controlled by adjustable delay circuits 21 which are clocked by the horizontal and vertical timing pulses delivered from amplifier A5 coupled to the replay head 16 associated with the inner track on the disc recorder. Adjustments to the delay circuits 21 are accomplished through means of a joy stick control 22 which delivers horizontal and vertical biasing signals to the delay circuits. The output from the delay circuits 21 is coupled to the blanking gates 20 and to a sync generator SG2. Sync generator SG2 delivers appropriately delayed horizontal and vertical sync pulses to an add circuit 23 where they are combined with the unblanked video signals received from the blanking gates 20. The output from the add circuit 23 is a composite of standard sync pulses and video signals which is delivered to a monitor 24 to provide a visual display by the cathode-ray tube thereof of a video frame corresponding to a portion of the scene made up of the array of frames F1–F4.

Figure 4A:
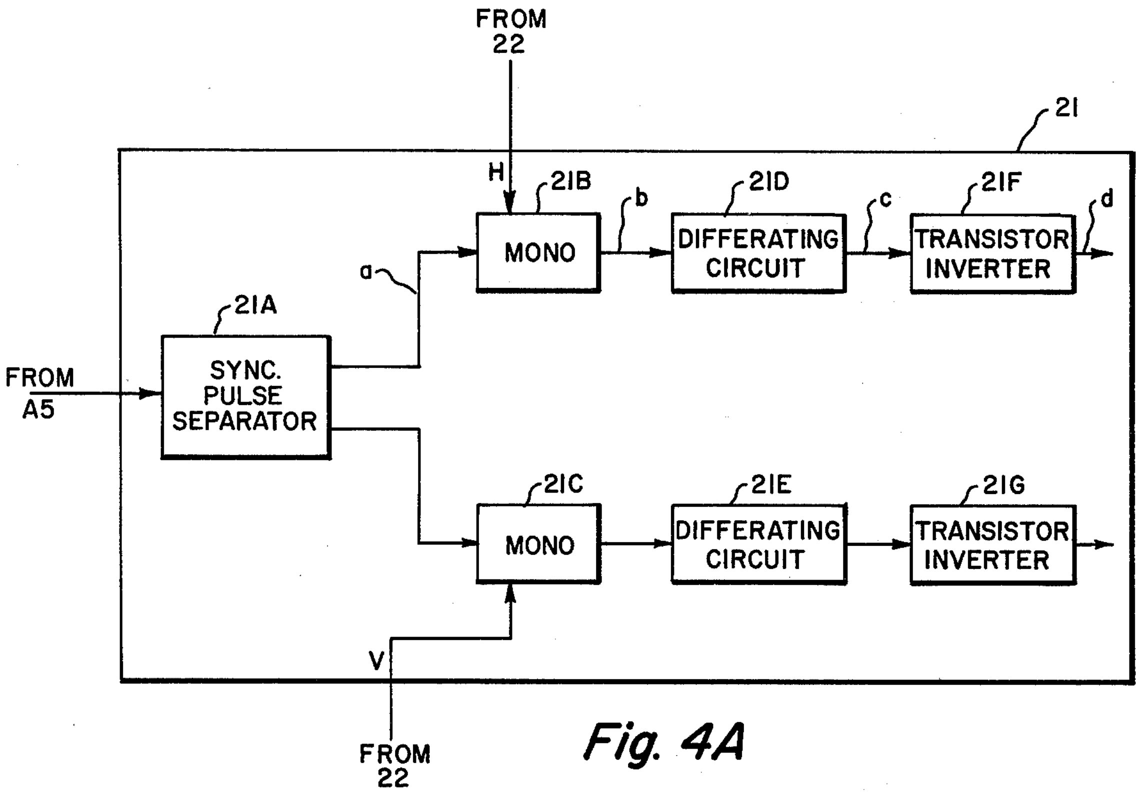
FIG. 4A is a schematic diagram of pulse delay circuits incorporated in the system of FIG. 4.
Figure 4B:
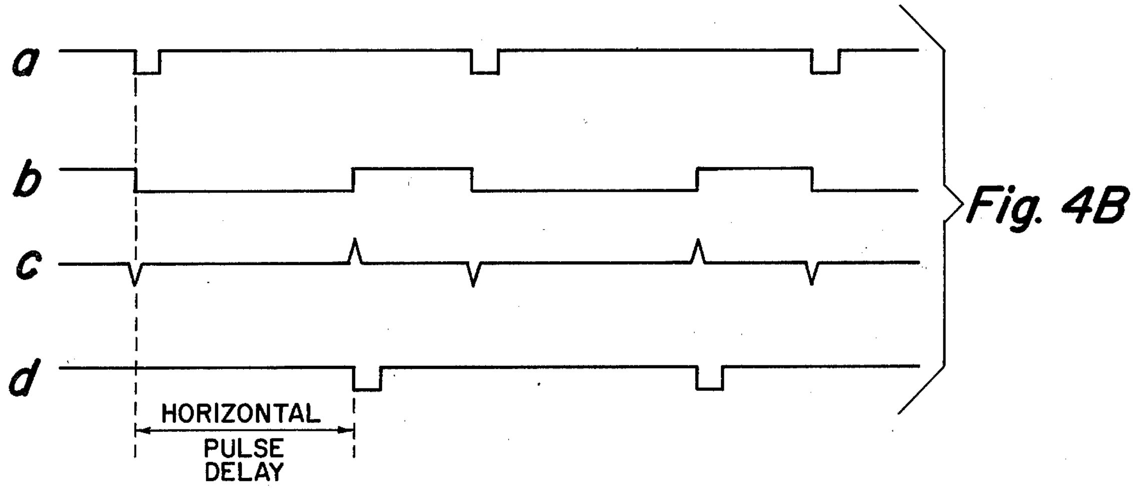
FIG. 4B consists of waveforms *a–d* illustrating the operation of the pulse delay circuits of FIG. 4A.

The time delay units T1–T4 and the delay circuits 21 may take the form of conventional, well-known type of delay lines or preferably well-known forms of monostable multivibrator-type delay units may be employed. FIGS. 4A and 4B illustrate a typical example and operational waveforms of the delay circuit 21. Timing pulses from amplifier A5 are passed through a sync pulse generator 21A which provides horizontal and vertical sync pulses that are separately applied as inputs to variable pulse width monostable multivibrators 21B and 21C. The pulse outputs from these monostable multivibrators are fed to differentiating circuits 21D and 21E, respectively, which are, in turn, coupled to transistor inverters 21F and 21G. Waveform *a* of FIG. 4B corresponds to the horizontal sync pulse waveform. Waveform *b* of FIG. 4B illustrates the pulse output from the monostable multivibrator 21B which pulse output is delayed by an amount determined by the variable horizontal bias signal from the joy stick control 22. Differentiating circuit 21D has an output waveform *c* of FIG. 4B made up of voltage spikes at the leading and trailing edges of pulse waveform *b.* Transistor inverter 21F delivers delayed horizontal pulses according to waveform *d* of FIG. 4B to the blanking gates 20 and sync generator SG2. The time delay to the vertical sync pulses is variably controlled by the joy stick control 22 in a similar manner to that just described in regard to the horizontal sync pulses.

The blanking gates are of the usual design well known to those skilled in the art and may take the form of solid-state switching circuits with appropriate logic circuits to respond to the timing pulses supplied by amplifier A5. The selection of the camera should be restricted to well-known forms which have a high degree of rectilinearity in the reproduced picture. This is not unduly restrictive provided the optics and electron-optics are carefully chosen. The foregoing description in regard to FIG. 4 has been addressed to a fourfold magnification of the scene. However, it will be apparent to those skilled in the art that the concepts may be employed to provide any desired magnification. If, for example, a 2000-line resolution is required with a standard 524-line camera and monitor, then sixteen separate frames of video signals will be required corresponding to the scene and sixteen recording tracks will be needed to store the separate video signals. The system is equally applicable to monochrome or color pictures and will provide a visual display of as much, or even more, the entire picture than the human eye can resolve with one visual fixation. This permits all parts of the picture to be viewed on an apparatus which is not capable of reproducing the entire picture with the same resolution.

Figures 5, 6:
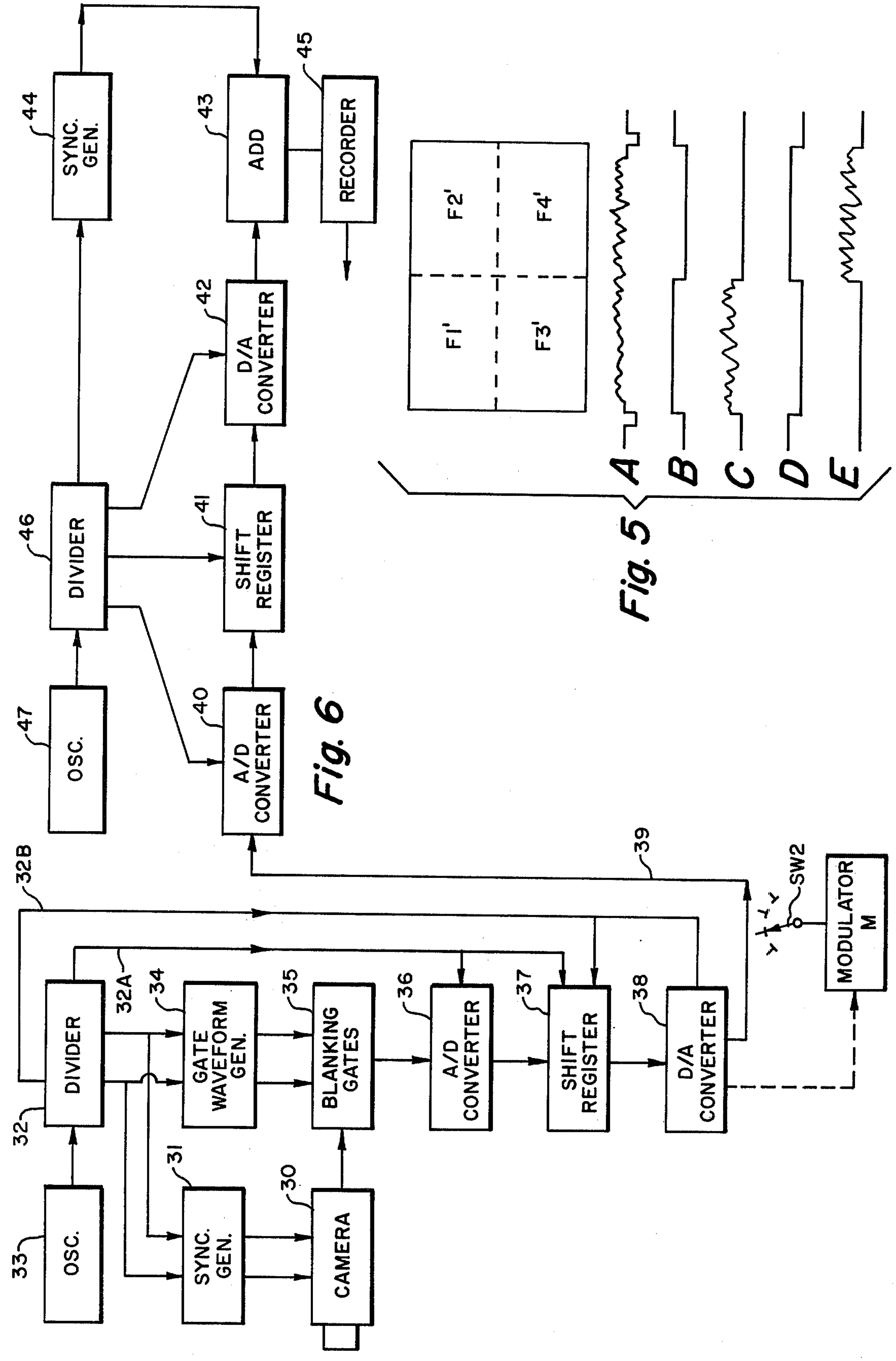
FIG. 5 is a view similar to FIG. 1 and illustrating a second embodiment of the present invention.
FIG. 6 is a schematic diagram of a television system according to the second embodiment of the present invention.

FIGS. 5 and 6 illustrate a second form of the television system according to the present invention. The advantages of the second embodiment of the television system include the use of a time buffer to effect bandwidth changes to provide slow-scan television signals so that they can be transmitted with a greatly reduced bandwidth requirement. In the first embodiment, it was necessary that the camera have a high linearity to the scanning sweeps and a precise adjustment of the camera framing in order that no obvious discontinuities occur, particularly where the corners of the component frames meet in the display. The second embodiment avoids these requirements by the employment of a camera having a high resolution capability to view an entire scene and then component picture frames are formed by electronic gating circuits. Thus, for example, by selecting a camera with a 1000-line resolution capability, one can produce four electronically-separated 525-line pictures with perfect continuity through the junctions between the contiguous component frames forming the original scene.

In FIG. 5, the overall outline of the rectangular block illustrated therein is intended to represent a picture field which can be scanned by a 1050-line camera. The video signal produced by the camera is made up of horizontal scan lines having a typical waveform A represented in FIG. 5. It will be observed that the usual horizontal blanking interval precedes the active portions of the scan line. The waveform B in FIG. 5 represents a gating waveform to select a part of the waveform A which is represented by waveform C in FIG. 5. Thus, the waveform C is the active video portion of a horizontal scan line that will form part of a component frame F1′ or F3′. In a corresponding manner, the waveform D of FIG. 5 corresponds to the gating of the video signal to select an active video portion thereof as represented by waveform E that will form part of a component frame F2′ or F4′. Two additional gating waveforms similar to waveforms B and D of FIG. 5 are obvious and they are used to provide the necessary gating to separate scan lines forming component frames F1′ and F2′ from the scan lines forming frames F3′ and F4′. When a 1050-line camera of a form presently available in the art is employed to produce a video signal of the entire scene, then each horizontal sweep of the scene will have a duration of approximately 30 microseconds and thus each component frame F1′–F4′ will have a horizontal sweep duration of approximately 15 microseconds with a delay period of 30 microseconds between horizontal sweeps. The vertical sweep period of each frame will be approximately 8 milliseconds with a blank period of 8 milliseconds between each field. The waveform for each component frame will still require the same bandwidth for transmission purposes as the original 1050-line picture waveform. This embodiment of the present invention provides that the video signals making up each of the component frames is expanded in time whereby the horizontal sweeps of the video signals have a duration of approximately 63.5 microseconds so that the component picture frames are suitable for recording and display by a standard 525-line apparatus in a manner already described in regard to FIG. 4. The television system illustrated in FIG. 6, therefore, includes a 1050-line camera 30 which is trained on the scene such as illustrated in FIG. 5. The camera receives sweep waveform control signals from a sync generator 31 that are, in turn, conducted through a divider circuit 32 to an oscillator 33. The horizontal control pulses from the divider circuit 32 are delivered to a gate waveform generator 34 whereby horizontal and vertical gating waveforms previously discussed in regard to FIG. 5 are applied to a blanking gate 35 which also receives the video signal from camera 30 so that the output from these blanking gates is four time-separated and discrete video signals corresponding to the component frames F1′–F4′ of the scene. The bandwidth requirement of these video signals is approximately four times that required for a standard 525-line video signal. A buffer store is employed to reduce the bandwidth of these video signals by expanding the horizontal scan line time period to a duration of approximately 63.5 microseconds. This buffer store may consist of a single time buffer system to provide separate video signals at a standard scan rate which are then passed through modulator M and switched by, for example, the switch SW2 for storing the video signals in the manner already described in regard to FIGS. 1–4. This buffer store system includes a 500-word, 6-bit per sample shift register coupled between an analog-to-digital converter and a digital-to-analog converter. The buffer store may also take the form of two individual time buffer systems where in the first system, the bandwidth requirements of the video signals are reduced down to a level of, for example, 2 kilohertz for transmission of these video signals over voice-grade telephone lines in the form of slow-scan communications or data links. The second time buffer system is then utilized to condense the slow-scan video signals up to a standard horizontal scan period of 63.5 microseconds which increases the bandwidth requirements of the signals.

Referring again to FIG. 6, the output from the blanking gates 35 consists of individual half lines of the original 1050-scan lines produced by the camera. The first half line for frame F1′ is passed through an analog-to-digital converter 36 into a digital buffer store in the form of a shift register 37 within approximately 15 microseconds. Clocking pulses at the horizontal scan rate are conducted from the divider 32 by line 32A to control the converter 36 and the shift register 37. Other clocking pulses at the vertical scan rate are conducted by line 32B to the shift register 37 to control the delivery of pulses to a digital-to-analog converter 38 which also receives control pulses from line 32B. The read-out rate from the shift register 37 can be selected to provide either a standard video signal made up of scan lines of 63.5-microsecond duration or the shift register can be read out at a much lower rate to provide an analog signal with a reduced bandwidth requirement which is suitable for transmission over a telephone link. The purpose of the analog-to-digital converter 36 is to enable clock-regulated use of the shift register 37 as a time buffer store. For most visual applications, 64 levels of gray scale will be adequate and, therefore, it will be sufficient to provide 6 bits per sample and 6 parallel, 500-bit shift registers. The number of levels of gray scale can be doubled by utilizing an additional register for each doubling of the gray scale. However, for printed matter and engineering drawings, for example, a single 500-bit register will suffice. The time buffer input rate will be $3 \times 10^7$ words per second.

In FIG. 6, the analog signal passed from the converter 38 is transmitted by a telephone line 39. The transmission can take the form of a vestigial sideband FM or AM signal, in which case line 39 would include a modulator and demodulator suitable for interfacing with the telephone line linking the two units. Thus, the read-out rate from the digital buffer store can be chosen to match the capacity of the telephone line. If, for example, a line conditioned to 2C quality is used, the shift register 37 will be read out at a rate of 2400 words per second. Since each input to the buffer store system is a half line of a video scan line containing 500 words, the read-out period would last for about one-fifth of a second or six frame periods of the 1050-line camera output. Therefore, one of the component frames F1′–F4′ can be completely read out within approximately 100 seconds. All four component frames of the entire scene may be transmitted in approximately 7 minutes. As illustrated in FIG. 6, the analog signal which is transmitted by line 39 is passed to a digital-to-analog converter 40 at the receiving location. The converter 40 forms of a second time buffer system which functions in this instance to convert the relatively low bandwidth video signal received over the telephone transmission line into a video signal at a rate which will produce a standard 525-line picture. The converter 40 feeds its digital output to a digital buffer store in the form of a shift register 41. The acceptance rate of the buffer store is selected at 2400 words per second and the output rate from the shift register will be such as to produce a 525-line picture or approximately $8 \times 10^6$ words per second. The output from the shift register 41 is converted by a digital-to-analog converter 42 to an analog format which is coupled to an add circuit 43 where synchronizing waveforms from a sync generator 44 are combined to form a standard 525-line video signal corresponding to each component frame in the scene. The output from the add circuit 43 is then fed to a storage medium such as a recorder 45 for processing of the separate frames of video signals in the manner already described in regard to FIG. 4. The analog-to-digital converter 40, the digital-to-analog converter 42 as well as the sync generator 44 receive a pulse control signal from a pulse divider circuit 46 that is timed by an oscillator 47. The oscillator 47 may be replaced, if desired, by prerecorded sweep waveforms which are read from a separate storage track on the recorder 45.

The third embodiment of the present invention which is illustrated in FIGS. 7–11 avoids the employment of a very wide-band time buffer store for the separate frames of video signals as just described in regard to FIGS. 5 and 6. This is accomplished according to the third embodiment of the present invention by modification to the conventional scanning waveform for a 1050-line camera or scanner. In order to more fully appreciate the underlying concept of this embodiment of the present invention, one must consider in regard to the last to be described embodiment that when a 1050-line visual is processed for display by a 525-line monitor, for example, the sweep waveform of the camera must be, in effect, modified so that each horizontal sweep period is twice as long as that required for a conventional 525-line monitor. This enables the switching of each horizontal sweep of a 1050-line camera at its midpoint into a second recording channel. An additional switching process takes place after the first 525 lines have been recorded on two separate recording channels so that a transfer is effected for the recording of the remaining 525 lines through other channels. Thus, four recordings are made, each capable of being displayed on a conventional monitor.

According to the third embodiment, in order that the video signals corresponding to component frames of a scene may be displayed with conventional interlacing of two fields in each frame at a rate of 30 frames per second, the scanning of the original 1050-line picture is carried out in a particular manner which involes a four-field interlace or a double-interlace scanning with a frame rate of 7½ per second. This embodiment of the present invention is intended for use for the recording of separate video signals corresponding to a single frame exposure of documents, photographic slides or stationary scenes, etc. and, therefore, increasing the exposure time to 133 milliseconds as compared with the conventional exposure time of 33 milliseconds is of negligible consequence. Obviously, the time to change a document or slide will be considerably greater than either of the exposure periods.

Figure 10:
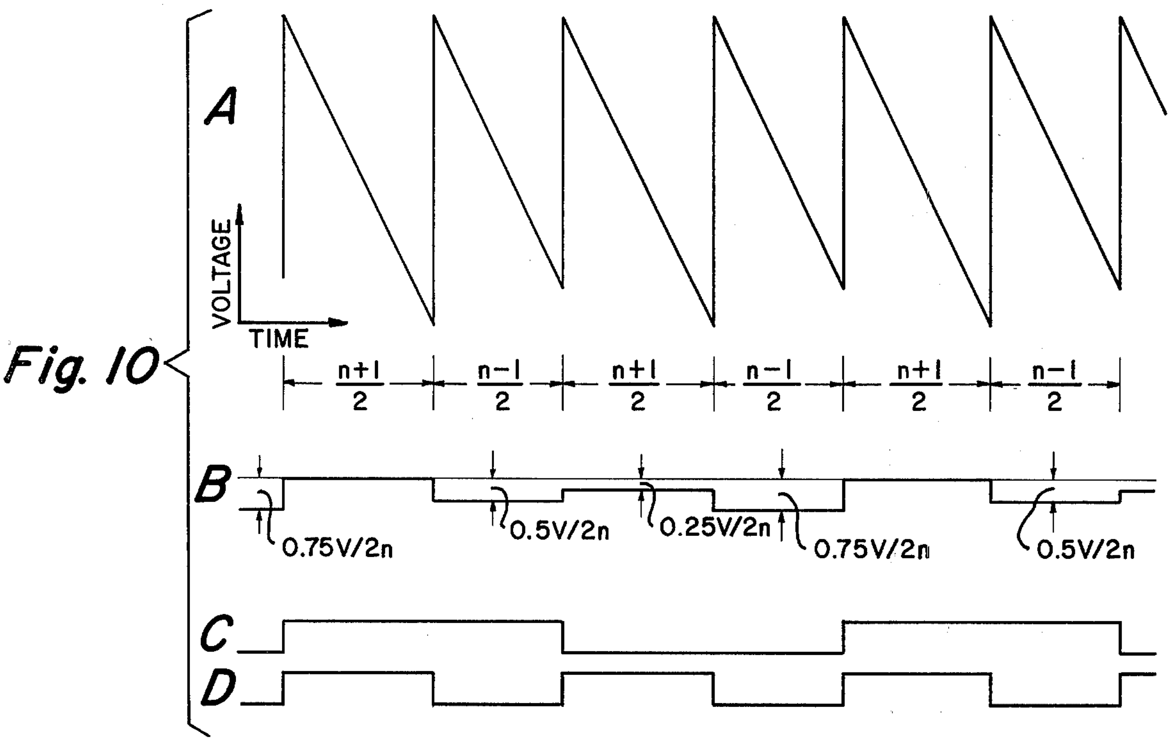
FIG. 10 consists of waveforms A–D which illustrate the sweep deflection for double-interlaced scanning of a scene according to the third embodiment of the present invention.

FIG. 10 illustrates a sweep waveform A for vertical deflection of the camera for double-interlace scanning. The waveform B is a deflection waveform added to the vertical centering voltage or current. The sweep waveform B is made up of alternating long and short deflections with the long deflection lasting for $(n+1)/2$ times the horizontal sweep period and the short deflection lasting for $(n-1)/2$ times the horizontal sweep period. For the television system under discussion, $n = 525$ and the number of horizontal sweeps included in the alternating vertical sweep periods would, therefore, be 263 and 262. This can be more readily understood by a consideration of an example where a $n = 15$ and, therefore, the horizontal sweeps per vertical sweep alternate between 7 and 8.

FIG. 7 illustrates a 30-line raster made up of four fields which are divided into four 15-line rasters to form quadrants *a*, *b*, *c* and *d* that are components of the overall raster. Thus, a camera controlled by the sweep waveform A of FIG. 10 and indexed according to waveform B will produce video scan lines in the sequence shown by the numbers at the left of FIG. 7. This sequence of horizontal scan lines is recorded on a magnetic disc using four tracks and switching the input waveform between eight recording heads arranged such that two recording heads are provided for each track. FIG. 8 is intended to illustrate the four tracks having recorded thereon the horizontal scan lines forming the complete raster for the example of a 30-line raster illustrated by FIG. 7. Segments of horizontal scan lines of the video signal are recorded in the sequence indicated by the numbers and the letters in each segment. In other words, the arcuate segments labeled in FIG. 8 as 1*a*, 1*b*, 2*a*, 2*b* . . . 30*c* and 30*d* correspond to segments of the scan lines in the exemplified raster of FIG. 7. It will be observed that the black radial stripes represent line blanking that precedes the recorded video signal in the outer track while the next inner track has the line blanking following the recorded video signal. The recording heads are so positioned that, for example, scan line segment 1*a* and scan line segment 1*b* are together a continuous recording of scan line 1. The scan line signal of line 1 is switched at its midpoint in the active line period. This insures that a display taken from the center of the complete raster will not have blanked bands between the four corners of the component frames. If some of the lines at the bottom of the swept raster are blanked to cover the vertical sweep flyback, there still is no separation between the bottom line of the two upper component frames *a* and *b* and the top lines of the two lower component frames *c* and *d*.

Figure 9:
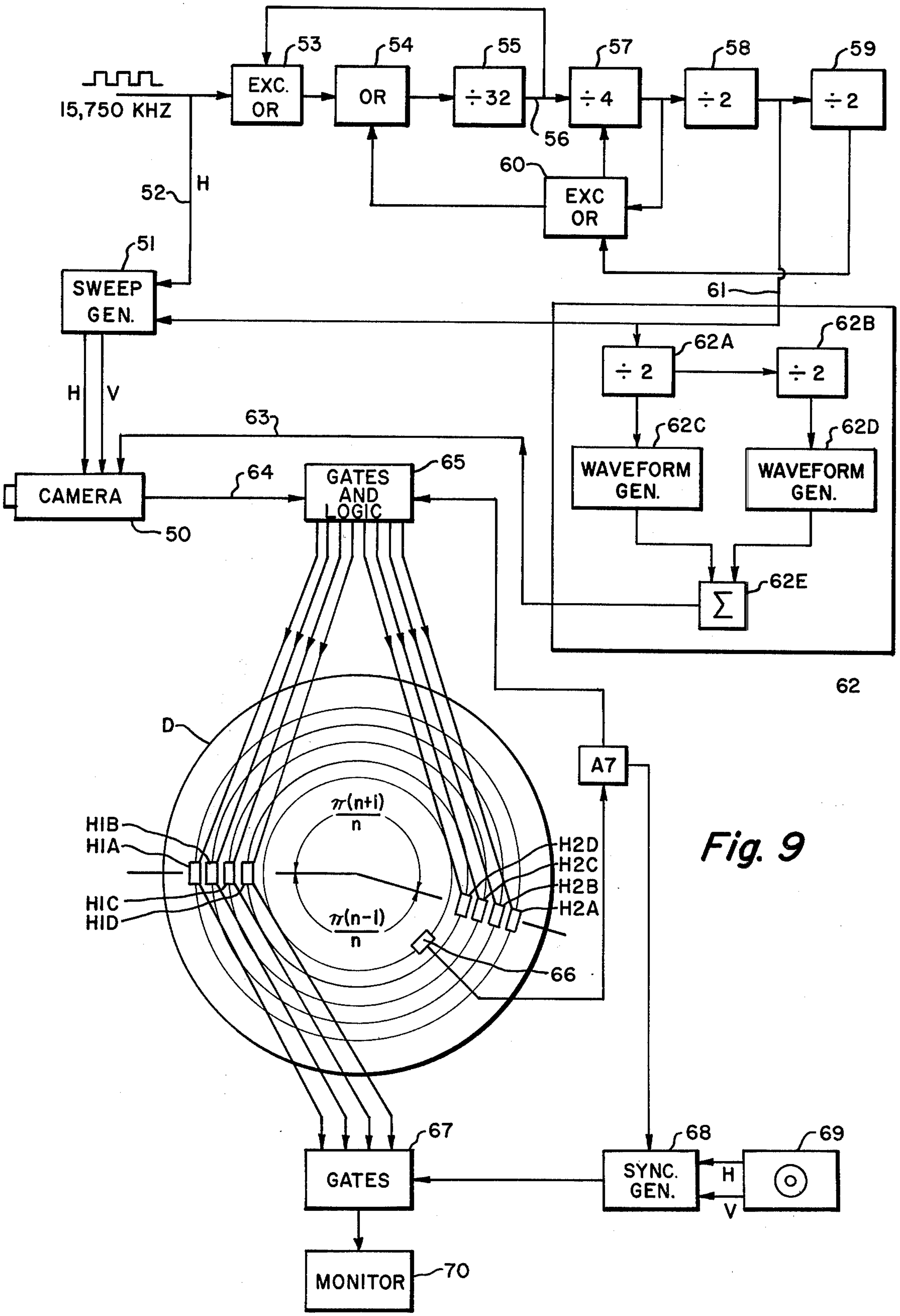
FIG. 9 is a schematic diagram of a television system according to the third embodiment of the present invention.

FIG. 9 illustrates the television system according to the third embodiment of the present invention and its operation will be described in regard to FIG. 11. As illustrated in FIG. 9, two recording heads H1A–H2A, H1B–H2B, H1C–H2C and H1D–H2D for each track on a magnetic disc-type recorder D are positioned in a dependent relation to the number of lines in each quadrant of the display. The sets of heads for each track must be displaced by a half-line period from a diametrically-opposite position. In other words, the angular relation between the heads for each track shall be:

$$\frac{\pi (n+1)}{n}$$

from a first head to the second head in each set and then:

$$\frac{\pi (n-1)}{n}$$

from the second head back to the first head in each set. It is not necessary for the heads on the four tracks to be radially aligned as shown in FIG. 9, but the displacement between a pair of heads for each track must be precise.

The system in FIG. 9 includes a camera 50 for producing a 1050-line video signal of a scene by controlling the electron beam in the camera according to a sweep waveform produced from a sweep generator 51. The horizontal and vertical sweep waveforms from the generator 51 are modified by controlling the generator to sweep the raster in the manner already described in regard to FIGS. 7 and 10. The control of the sweep generator can be accomplished by different techniques but the one employed according to the system shown in FIG. 9 includes the use of a chain of binary counters coupled to the output of an oscillator circuit having an output pulse rate of 15,750 kilohertz. This forms the horizontal scan rate control signal which is delivered by line 52 to the sweep generator 51. The 15,750 kilohertz pulse output is fed to an exclusive OR circuit 53 having its pulse output fed to OR circuit 54 and thence to a tandem arrangement of binary counters, the first of which is counter 55 made up of five binary stages to divide the pulse input by 32. The pulse output from counter 55 is fed by a branched line 56 to the exclusive OR circuit 53 to inhibit one pulse of the input pulse rate of 15,750 kilohertz. The branched line 56 from counter circuit 55 also forms a pulse input to a two-stage binary counter 57 which is, in turn, coupled to a single-stage binary counter 58 having its pulse output fed to a single-stage binary counter 59. The pulse output from the two-stage binary counter 57 is fed to the exclusive OR circuit 60 which also receives the pulse output from the binary counter 59. Output pulses from the exclusive OR circuit 60 are fed to both the OR circuit 54 and the counter 57. The pulse output from the binary counter 58 in line 61 represents vertical sweep control pulses which correspond to a horizontal pulse count of 262, 263, 262 and 263. This pulse waveform fulfills the requirements for the double-interlaced scanning of the raster. The vertical sweep control pulses are delivered by line 61 to the sweep generator 51, and to the shift waveform generator 62. The output of shift waveform generator 62 is fed to the camera. The shift waveform generator 62 includes a single-stage binary counter 62A which receives the vertical sweep control pulses from line 61. The counter 62A is coupled to a single-stage binary counter 62B. The pulse output from counters 62A and 62B is fed to waveform generators 62C and 62D, respectively, which, in turn, feed their output signals to a summation circuit 62E. The signal from circuit 62E is fed by line 63 to the camera 50. In this way, the camera is controlled by the shift waveform generator 62 and sweep generator 51 to achieve a double-interlaced scanning which, in other words, is an interlacing of successive rasters in the total raster that has an even number of sweeps. Waveform B of FIG. 10 provides a beam deflection that is proportional to the vertical deflection currents which, according to the embodiment illustrated in FIG. 9, is taken as a function of the instantaneous velocity of the vertical sweep. Waveforms C and D of FIG. 10 are the pulse outputs from waveform generators 62D and 62C, respectively.

Line 64 conducts the video signal from camera 50 to gates and logic circuit 64 which essentially includes a blanking gate coupled to each replayed video signal. These gates are rendered conductive in response to a control signal from amplifier A7 which receives a pulse input signal from a replay head 66 associated with a fifth recording track containing a permanent recording of pulse waveforms. Each blanking gate in the gate circuit 65 is connected to a separate one of the eight recording heads. Four of these recording heads, as illustrated in FIG. 9, are also replay heads and they are connected to gates 67 which essentially include blanking gates controlled by a sync generator 68 that is, in turn, responsive to the pulse waveform from amplifier A7. The sync generator 68 is also responsive to a horizontal and vertical bias control signal delivered from a joy stick control 69. The joy stick control produces a phase shift to the sync pulses from the generator 68 to control the blanking gates 67 so as to select only those portions of the video signal replayed from the disc which form horizontal sweep lines in the display area which is part of the total scene viewed by the camera 50. A monitor 70 is illustrated for displaying unblanked video signals corresponding to the desired portion of the entire scene.

Figure 11:
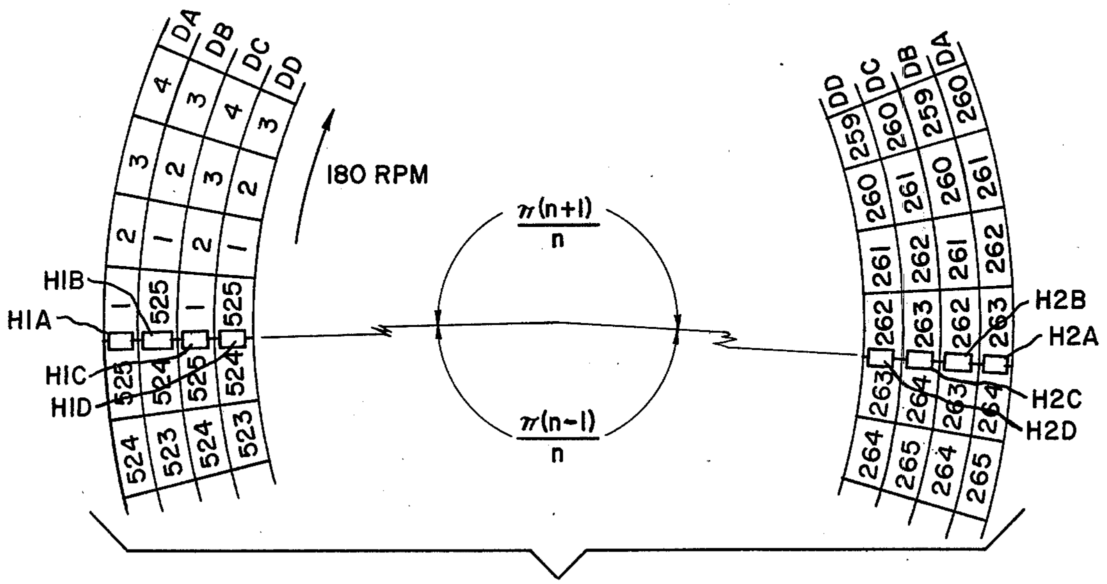
FIG. 11 illustrates the recording schedule for 525-scan lines in each of four component frames.

FIG. 11 illustrates the manner by which portions of the video signal corresponding to double-interlaced scan lines of a 1050-line raster are recorded on the disc recorder D of FIG. 9. FIG. 11 represents only a portion of the track area at the location of each set of recording heads. After four complete revolutions of the disc, the four tracks each contains a conventional 525-line recording of video signal corresponding to one component frame of the four quadrant frames *a*, *b*, *c* and *d* forming the scene. Each such video signal can be transmitted, displayed or rerecorded as the conventional video waveform for a 525-line picture by using either one of the sets of heads. Let it be assumed that the disc recorder is driven by a motor in a well-known manner at 1800 revolutions per minute. It should be remembered that the gates and logic circuit 65 are responsive to the control signal replayed from the fifth and separate inner track on the disc recorder using head 66. The recording sequence for the double-interlaced 1050-line raster starts by selecting heads H1A and H1B for the two outer tracks to record 132 scan line segments for frame A on track DA with switching to record scan line segments for frame B on track DB finishing with scan line segment 263B. Switch to record heads H1C and H1D for tracks DC and DD and continue recording starting with line segment 265C for the next 131 scan lines on tracks CD and DD, concluding with scan line segment 525D on track DD. Switch to the heads H1A and H1B for tracks DA and DB and record the halved lines for the next 131 scan lines on tracks DA and DB, concluding with the recording of the line segment 262B. Switch to recording heads H1C and H1D associated with tracks DC and DD and continue recording starting with the line segment 264 and continue recording the next 131 scan lines on tracks DC and DD to conclude with the recording of scan line segment 524D. The recording process continues by next selecting the second set of heads associated with each of the tracks according to the following schedule which starts with selecting the heads H2A and H2B associated with tracks DA and DB and start the recording process with line segment 264A and continue recording for the next 131 scan lines on tracks DA and DB, concluding with the recording of line segment 524B. Recording heads H2C and H2D associated with tracks DC and DD are next selected to continue the recording by starting with line segment C1 and continue the recording for the next 132 scan lines on tracks CD and DD, concluding with the recording of line segment 263D. The record heads H2A and H2B associated with tracks DA and DB are again selected to record line segment 265A and continue the recording for the next 132 scan lines on tracks DA DB, concluding with the recording of scan line segment 525D. The record heads H2C and H2D associated with tracks DC and DD are again selected to continue the recording of line segment C2 and proceed with the recording of the next 131 scan lines on tracks DC and DD, concluding with the recording of line segment 262D. This entire recording procedure is accomplished after four complete revolutions of the disc D. The outputs from one set of the record heads when operated in a replay mode are conducted through the gate 67 which conducts unblanked portions of the video signals that form a single contiguous frame of 525 scan lines constituting a portion of the original scene. The use of the joy stick control 69 enables adjustments to the timing of the synchronizing waveform at the display monitor with corresponding adjustments to the synchronous switching between the four replayed video waveforms to thereby move the displayed frame of picture to any desired position of the total scene. The adjustment of the timing synchronization can be achieved by forms of control other than the joy stick control such as, for example, injecting or inhibiting pulses in the binary counter used to provide the horizontal and vertical synchronizing waveforms.

As a preface to the following description of the fourth embodiment of the present invention, it is relevant to recall that the third embodiment, for example, is addressed to a television system for processing very high resolution video waveforms to produce an array of component frames of separate video signals. It is also relevant to bear in mind that the first and second embodiments of the television system of the present invention utilized a 525-line monitor, for example, to display any part of a higher resolution picture as a magnified portion thereof which can be freely moved about the entire high resolution display. It is a purpose of the fourth embodiment of the television system of the present invention to convert the high resolution video signal into a form which is suitable for displaying the entire content of the original scene by a monitor as a single low resolution frame. Thus, the fourth embodiment enables the viewing of the entire scene with a 525-line resolution while at the same time the television system has the feature of selecting any particular chosen portion of the scene for magnification and display on the same 525-line monitor. In essence, therefore, the system of the fourth embodiment includes the passing of the high resolution video signal from either a camera or a replayed recording of such a signal through a low-pass filter to reduce the resolution, compressing the time duration of each horizontal sweep form, reducing the number of horizontal sweep forms by the weighed addition of adjacent lines, and then recording the reduced resolution waveform with a conventional 525-line format.

Figure 12:
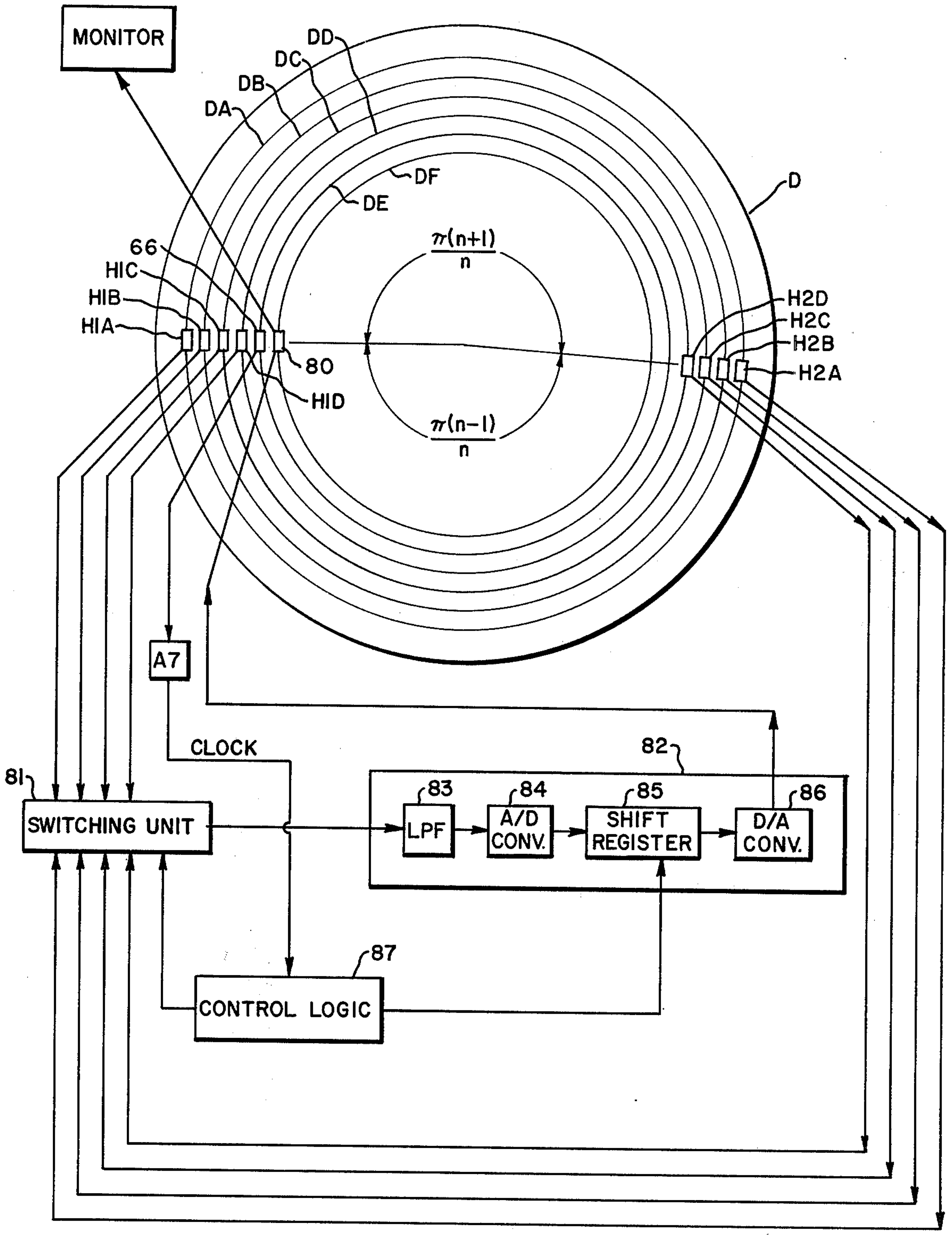
FIG. 12 illustrates a television system according to a fourth embodiment of the present invention.

For the purpose of disclosing the fourth embodiment of the television system according to the present invention, a system will be described for use in conjunction with the system of the third embodiment wherein it will be assumed that a 1050-line visual corresponding to a scene has been processed and recorded on the four concentric tracks of the magnetic disc recorder D while rotating at 1800 revolutions per minute. It will be recalled that each track contains a recording of 525 line segments corresponding to a component frame of the scene and each track has two precisely registered recording heads H1A–H2A, H1B–H2B, H1C–H2C and H1D–H2D. Each of the component frames can be displayed at will on a 525-line monitor. In addition, unblanked parts of the component frames can be selected at will on a 525-line monitor. However, it requires a 1050-line monitor to display the entire scene. The now to be described system provides a display of the entire scene by a 525-line monitor. In FIG. 12, the disc D corresponds to the magnetic recording disc previously described in regard to the third embodiment illustrated in FIGS. 9 and 11. In addition to the four storage tracks DA, DB, DC and DD, the disc includes two additional tracks and one of these is a track DE which has the replay head 66 for providing a pulse control signal coupled to amplifier A7. The inner track DF on the disc D has a record and replay head 80 utilized to record a processed 525-line version of the complete 1050-line picture. The eight record and replay heads arranged as pairs on the outer four tracks deliver the replayed video signals to a switching unit 81 which includes a blanking gate for each replayed video signal that is controlled to select portions of each video signal replayed from each track so that the video signals can be processed in a logical sequence. The output from the switching unit 81 is delivered to a time buffer 82 and this output takes the form of analog signals replayed from the two heads on the outer four tracks. As FIG. 12 illustrates, the time buffer essentially consists of a low-pass filter 83 selected to have a cutoff frequency of about one-half of the bandwidth of the replayed signals. The output from filter 83 is coupled to an analog-to-digital converter 84 having a capacity which can deliver an 8-bit parallel stream of pulses to eight parallel shift registers 85 with the digital output therefrom fed to a digital-to-analog converter 86. The analog output from the converter 86 is fed to the record and replay head 80 for storage as a standard 525-line video signal corresponding to the entire original scene as represented by the output from a 1050-line camera. The clocking waveform replayed by head 66 and delivered from amplifier A7 is connected to a control logic unit 87 which provides the logic switching for the blanking gates in the switching unit 81 and the necessary control switching for the time buffer 82. Those skilled in the art will readily understand that FIG. 12 does not include in the interest of simplicity the usual amplifiers, modulators and demodulators conventionally required for recording and replaying the output signal from the time buffer 82.

The control logic circuit 87 synchronizes a selection of the appropriate portions of video scan lines replayed from the four outer tracks as well as the processing and rerecording of the selected video signals delivered to head 80 on the inner track. FIG. 13 illustrates the manner by which the logic control circuit 87 controls the blanking gates in the switching unit 81 whereby the four 525-line waveforms are rerecorded as a single video signal corresponding to the entire frame on the inner track DF of the disc. It will be assumed that the four outer tracks of the disc contain recorded frames of video signal according to the third embodiment of the present invention and that the disc is positioned relative to the two heads for each track so that heads H1A and H1C are associated with scan line segment 1 for component frames A and C while the other heads for the same tracks are precisely located above recorded line segments for lines 264.

Following the initiation of the process, the replayed output of lines 1 and 264 of track DA will be added and fed through the low-pass filter 83 with a cutoff at, for example, 2.0 megahertz. The analog-to-digital converter will produce an 8-bit parallel stream at a clocking rate sufficient to retain the content of video information. For example, a 4.8-megahertz pulse rate corresponds to the delivery of 256 samples for the active portion of the television line which is the only portion necessary in the process. FIG. 13 illustrates that the beginning of the active portion of line 1 stored by track DB is aligned with the end of the active portion of line 1 stored by track DA. When lines 1 and 264 from track DA are completely replayed, the video signal for lines 1 and 264 from track DB is switched and passed through the low-pass filter 83, converter 84 and stored by the shift register 85 of the buffer store which will then contain 512, 8-bit samples representing the top two lines of the high resolution display combined in low resolution form. The buffer store input is then disconnected from the replay heads of the disc and the stored content is held for 523-television line periods after which the stored content is delivered at twice the previous clock rate to the digital-to-analog converter 86 and recorded by the magnetic disc in the position shown as line 1 on track DF. By the employment of the double-spaced clock rate of 9.6 megahertz, the 512 samples are recorded and form one active line period for a 525-line display. The information bandwidth of this recorded line will be 4 megahertz, which is compatible with a 525-line display. A twofold reduction of resolution in both horizontal and vertical directions is achieved by continuing this process of converting four lines of the high resolution recording into one line of the low resolution recording during each rotation of the disc for each active line of the low resolution 525-line display. As each transfer takes place, the time period for holding the information in the buffer store reduces by one line period in order that two rotations of replayed visuals can be converted and rerecorded for a one rotation recorded display. The sequence can be described as follows: Pick up lines 1 and 264 from tracks DA and DB, hold for a period of 523 lines and record as line 1 on track DF. Pick up lines 2 and 265 from tracks DA and DB, hold for a period of 260 lines and record as line 264 on track DF. Pick up lines 3 and 266 from tracks DA and DB, hold for a period of 522 lines and record as line 2 on track DF. Pick up lines 4 and 267 from tracks DA and DB, hold for a period of 259 lines and record as line 265 on track DF. This process continues until the bottom lines of the two upper component quadrants of the scene are reached. These bottom lines must be added to the top lines of the two lower component quadrants of the scene.

The conversion process continues by picking up lines 263 from tracks DA and DB and lines 1 from tracks DC and DD. These lines are held for a period of 392 lines and recorded as line 132 on track DF. Pick up lines 264 and 2 from tracks DC and DD, hold for a period of 129 lines and record as line 395 on track DF. The process continues until lines 522 and 260 are picked up from the tracks DC and DD and immediately recorded as line 524 on track DF. Pick up lines 523 and 261 from tracks DC and DD and immediately record as line 262 on track DF. Pick up lines 524 and 262 from tracks DC and DD, hold for a period of 524 lines and record as line 263 on track DF.

In practice, all of these conversion steps need not be included because there is no need to transfer those lines which are included in the vertical blanking periods. The signal replayed from track DF can be passed through a processing amplifier for blanking and sync addition before display or retransmission. Assuming the conventional 495-active lines in a 525-line display, the conversion process will require 16.5 seconds for completion.

Although the conversion process has been described for a 1050-line resolution to a 525-line resolution, it applies to any standards with the same ratio. For example, the conversion from a 1750-line resolution to an 875-line display will follow the same procedure with appropriate changes in clock frequency, bandwidth of the low-pass filter, size of the shift register, and the number of transfers which are carried out.

If we consider a 9-1 transfer as, for example, a 1575-line resolution to a 525-line resolution, the recording on nine tracks TA-TI will have been made as illustrated in FIG. 14. The integration process will require two heads on track TJ used for recording the low resolution waveform. This is in order to minimize the total transfer time because three signals must be added at each transfer. The process is described with reference to FIG. 14 as follows: The first step is to pick up lines 1 and 264 from track TA, and feed them into the buffer store, followed immediately by lines 1 and 264 from track TB, and then lines 1 and 264 from track TC. The low-pass filter at the input to the buffer store must have a cutoff frequency one-third of 4 megahertz, and the clocked sampling frequency must be such that three successive line inputs fill the shift register. For example, a frequency of 3.2 megahertz will provide 512 samples in the period of the three sequential active line periods. The shift register holds this information for 262 lines, then commences to recirculate and add in analog from the contents to line 2 picked up in sequence from tracks TA, TB and TC. This combination is held for 262 lines and discharged at a clock rate of 9.6 megahertz for recording on line 1 of track TJ as a conventional 4-megahertz bandwidth active line of approximately 53-microsecond duration. A new line is added to track TJ for each rotation of the disc using the two heads on track TJ in alternating sequence.

Pick up lines 1 and 264 from tracks TA, TB and TC, hold for 262 lines, then pick up and add lines 2 from tracks TA, TB and TC, hold for 262 lines and record as line 1 on track TJ (head 1). Pick up lines 3 and 266 from tracks TA, TB and TC, hold for 261 lines, pick up and add lines 265 from tracks TA, TB and TC, hold for 262 lines and record as line 264 on track TJ (head 2). Pick up lines 4 and 267 from tracks TA, TB and TC, hold for 262 lines, pick up and add lines 5 from tracks TA, TB and TC, hold for 260 lines and record as line 2 on track TJ (head 1). Pick up lines 6 and 269 from tracks TA, TB and TC, hold for 261 lines, pick up and add lines 268 from tracks TA, TB and TC, hold for 260 lines and record as line 265 on track TJ (head 2). Pick up lines 7 and 270 from tracks TA, TB and TC, hold for 262 lines, pick up and add lines 8 from tracks TA, TB and TC, hold for 258 lines and record as line 3 on track TJ (head 1).

Continue this process, with the first hold period alternating between 262 and 261 line periods and the second hold period reducing by 2 after each pair of transfers, until 175 lines have been recorded. The sequence continues as follows: Pick up lines 2 and 264 from tracks TD, TE and TF, hold for 261 lines, pick up and add lines 1 from tracks TD, TE and TF, hold for 88 lines and record as line 351 on track TJ (head 2). Pick up lines 3 and 265 from tracks TD, TE and TF, hold for 262 lines, pick up and add lines 266 from tracks TD, TE and TF, hold for 86 lines and record as line 89 on track TJ (head 1).

The sequence continues until:

Pick up lines 132 and 134 from tracks TD, TE and TF, hold for 262 lines, pick up and add lines 395 from tracks TD, TE and TF, immediately record as line 132 on track TJ (head 1). Pick up lines 134 and 396 from tracks TD, TE and TF, hold for 261 lines, pick up and add lines 133 from tracks TD, TE and TF, immediately record as line 395 on track TJ (head 2). The second hold time now reverts to 261 line periods. Pick up lines 135 and 397 from tracks TD, TE and TF, hold for 262 lines, pick up and add lines 398 from tracks TD, TE and TF, hold for 261 lines and record as line 133 on track TJ (head 1). The sequence continues until the tracks TD, TE and TF have been completely processed when the input to the buffer store is switched to tracks TG, TH and TI for recording the integrated pick up from lines 1, 2 and 264 as line 176 on track TJ and then continue until completion. The total time required for the process is 16.5 seconds. If only one head is used on track TJ, this time is increased, but the process can still be achieved. If it is desired to weight the three lines being integrated, each transfer attenuation can be switched in appropriate sequence.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a television system of the type wherein a portion of a transmitted scene is displayed by a television receiving tube with high resolution as compared with the display resolution of the entire scene by the same television receiving tube, the combination comprising:

means for producing separate video signals corresponding to separate frames forming an array of component frames of a scene, a storage medium including independent recording means to separately record the video signal corresponding to each frame in the array of frames forming the scene, timing control means to synchronize the video signals in phase-shifted relations for separate recording by said storage medium such that a video signal corresponding to one component frame of the scene is recorded at a predetermined time-displaced relation to the recording of the video signal corresponding to a different component frame that is contiguous therewith in the scene, said timing control means including time delay means for each one of at least some of the separate video signals, means coupled to each time delay means for producing a sync phase control signal, sync generator means for applying horizontal and vertical scan control pulses to said means for producing separate video signals, and control means for coupling each sync phase control signal to said sync generator means to phase shift the horizontal and vertical scan control pulses and thereby provide phase-shifted video signals corresponding to the component frames in the array forming the scene.

2. In a television system according to claim 1 wherein said storage medium includes the first recording and replay means for horizontal scan lines of a first video signal corresponding to a first component frame of an array of contiguous frames making up a scene, second recording and replay means for horizontal scan lines of a second video signal corresponding to a second component frame which is horizontally contiguous with said first component frame, and third recording and replay means for horizontal scan lines of a third video signal corresponding to a third component frame which is vertically contiguous with said first component frame.

3. In the television system according to claim 1, the combination further comprising means for modulating a subcarrier with the phase-shifted and separate video signals delivered from said means for producing separate video signals, and control means for coupling the video signals in the phase-shifted relation with said storage medium for separate and independent recording thereof.

4. In the television system according to claim 3 wherein said time delay means includes at least one delay circuit for phase shifting the sync control signal by a time period corresponding to the horizontal blanking interval between the horizontal scan control pulses.

5. In the television system according to claim 3 wherein said time delay means includes at least one delay circuit for phase shifting the sync control signal by a time period corresponding to approximately the vertical blanking intervals of the scan control pulses.

6. In the television system according to claim 3 wherein said time delay means includes at least one delay circuit for phase shifting the sync control signal by a time period corresponding to the sum of the blanking interval of a horizontal sync pulse and the blanking interval of a vertical sync pulse.

7. In the television system according to claim 3 wherein said means for producing a sync phase control signal includes means for replaying a recorded control signal from a separate recording track on said storage medium, and amplifier means for the replayed recording of the replayed recording of the control signal.

8. In the television system according to claim 1, the combination further comprising television display means including a cathode-ray tube for displaying a frame of a video signal representing only a portion of the video signals selected from the array of frames in the scene, and control means including gates for blanking out all but a contiguous portion of the replayed separate recordings of video signals from said storage medium to form a selected single frame of video signal for display by the cathode-ray tube.

9. In a television system of the type wherein a portion of a transmitted scene is displayed by a television receiving tube with high resolution as compared with the display resolution of the entire scene by the same television receiving tube, the combination comprising:

means for producing separate video signals corresponding to separate frames forming an array of component frames of a scene, a storage medium including independent recording means to separately record the video signal corresponding to each frame in the array of frames forming the scene, timing control means to synchronize the video signals in phase-shifted relations for separate recording by said storage medium such that a video signal corresponding to one component frame of the scene is recorded at a predetermined time-displaced relation to the recording of the video signal corresponding to a different component frame that is contiguous therewith in the scene, sync generator means for producing horizontal and vertical scan control pulses, gate means for blanking out all but a single video signal frame consisting of contiguous portions of the replayed separate recordings of video signals from said storage medium, time delay circuit means for applying phase control signals to said gate means and said means for generating horizontal and vertical scan control pulses, and means coupled to said gate means and said sync generator means for combining in a synchronous relation the unblanked video signal frame received from said gate means with horizontal and vertical scan control pulses received from said sync generator.

10. In the television system according to claim 9, the combination further comprising adjustable control means coupled to said time delay circuit means for biasing the phase control signals applied to said gate means and said sync generator means to thereby select the contiguous portions from the replayed separate recordings of video signals that form the single video signal frame for display by a receiving tube.

11. In the television system according to claim 9, the combination further comprising means in the replay signal path from said storage medium to said gate means for amplifying and demodulating the replayed separate recordings of video signals.

12. In the television system according to claim 9, the combination further comprising means including an amplifier coupled to said time delay circuit for replaying a recorded control signal from a separate recording track on said storage medium.

13. In the television system according to claim 9 wherein said gate means includes a blanking gate coupled in the replay signal path of each recorded video component frame for blanking out all but portions of selected horizontal scan lines thereof which form with the other unblanked portions of selected horizontal scan lines a single video signal frame.

14. In a television system, a method for producing a high resolution display frame corresponding to a window-like portion of an entire scene, said method including the steps of:

generating phase-shifted synchronizing waveforms for each one of at least some of separate video signals to control the production of the separate video signals with corresponding phase-shifted relations such that the active video portions of scan lines for contiguous horizontally-arranged frames are continuous and the active video portions of scan lines for contiguous vertically-arranged frames for coincidentally timed, using the phase-shifted synchronizing waveforms to control a sync generator to produce corresponding horizontal and vertical scan control pulses, using said horizontal and vertical scan control pulses for producing separate video signals corresponding to separate frames of an array of contiguous component frames forming a scene, storing the separate video signals in their phase-shifted relation, and selecting contiguous active video portions of unblanked scan lines from the replayed stored video signals to form a single video frame for displaying a window-like portion of the entire scene.

15. In the television system according to claim 14, the method including the further steps of adding adjustably-controlled time synchronizing waveforms to the selected contiguous portion of unblanked scan lines forming the single video frame, and controlling the selection of the contiguous active video portion of unblanked scan lines according to the adjustably-controlled time synchronizing waveforms.

* * * * *